July 8, 1958
C. G. JOA
2,842,169
AUTOMATIC FEED FOR SQUARING WORK FED TO
THE SAW OR SAWS OF A TENONER
Filed March 15, 1957
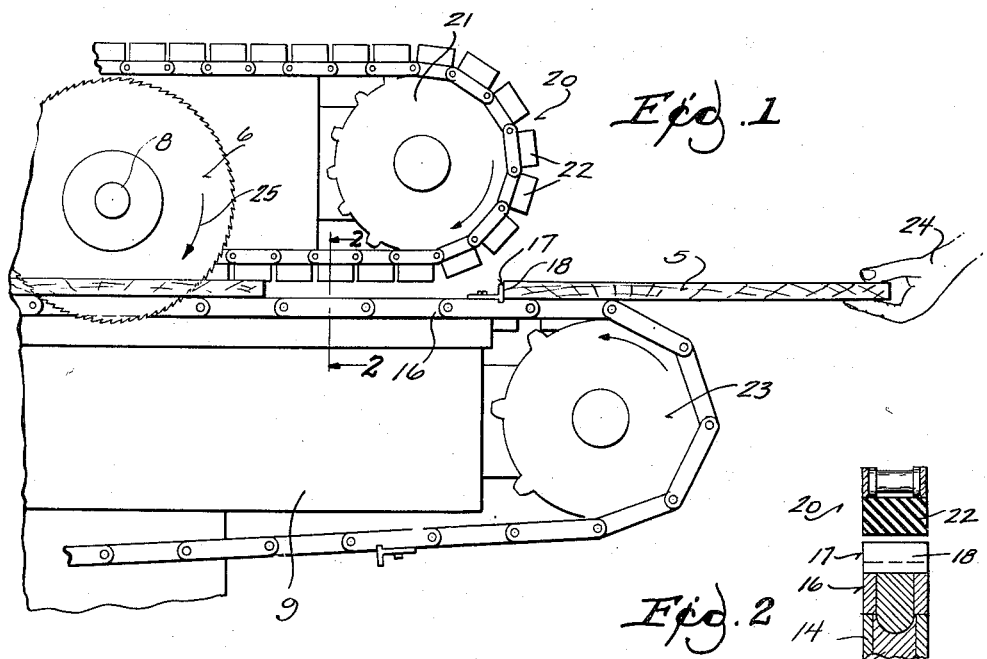
Fig. 1
Fig. 2
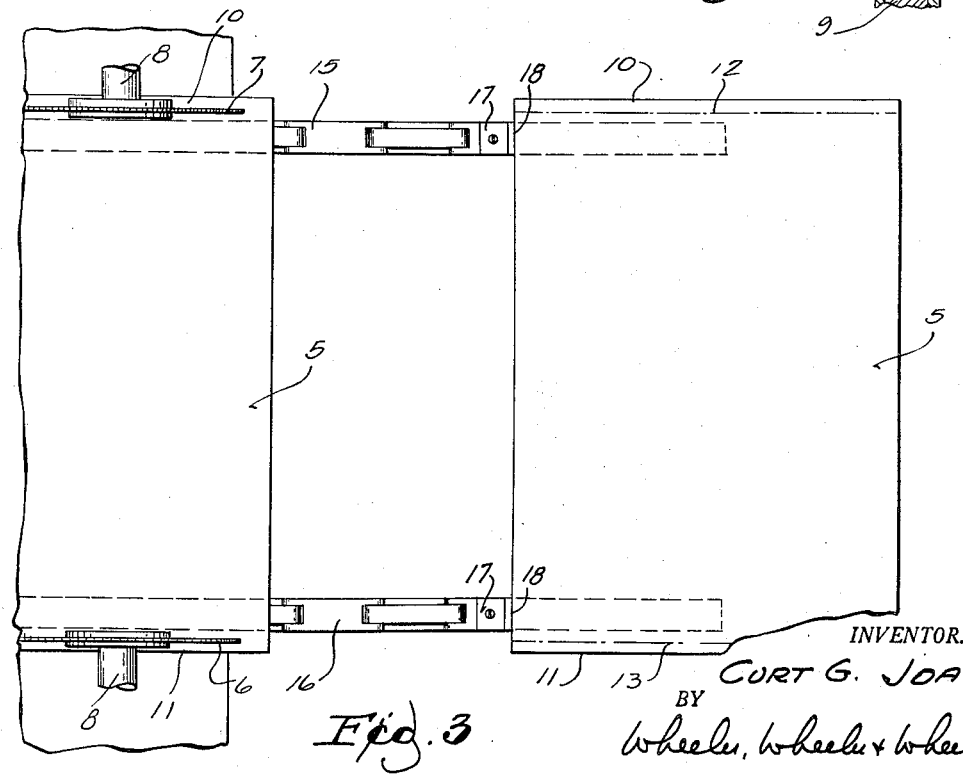
Fig. 3
INVENTOR.
CURT G. JOA
BY
Wheeler, Wheeler & Wheeler
ATTORNEYS United States Patent Office 2,842,169
Patented July 8, 1958

2,842,169

AUTOMATIC FEED FOR SQUARING WORK FED TO THE SAW OR SAWS OF A TENONER

Curt G. Joa, Boynton Beach, Fla.

Application March 15, 1957, Serial No. 646,315

2 Claims. (Cl. 143—49)

This invention relates to an automatic feed for squaring work fed to the saw or saws of a tenoner or other automatic woodworking machine.

In the past, commercial machines have been made with tables of sufficient length to receive the entire dimensions of each workpiece in advance of forwardly directed shoulders of squaring lugs on the feed chains. The feed chains and/or the surfaces of the table must be substantially smooth and flat to avoid damage to the face of the workpiece. The operator has had to have clearance within which to position the workpiece ahead of the advancing shoulders so that the workpiece will be squared up by the shoulders before being engaged by the holddown preliminary to exposure to the tools. By reversing the shoulders on the feed chains without other changes in the feeding mechanism, the positioning of the work by the operator is greatly facilitated and the length of the feed table can be shortened by several feet, thus effecting savings which may amount to several thousand dollars in the case of a large automatic machine.

In the drawings:

Fig. 1 is a diagrammatic view in longitudinal section showing the feeding end of a woodworking machine embodying the present invention.

Fig. 2 is a detail view through the feed chain and a portion of the table on line 2—2 of Fig. 1.

Fig. 3 is a fragmentary plan view of the parts shown in Fig. 1.

The particular device selected to exemplify the invention happens to be merely a pair of spaced trimming saws for cutting waste from the ends of the workpiece 5. The saws 6 and 7 are mounted on any suitable arbors such as that shown at 8 in Fig. 1 and are ranged at the ends of the table 9 to cut from the workpiece 5 the waste strips 10 and 11 outside of the dotted lines 12 and 13 respectively.

Operating in channels in the table such as that shown at 14 in Fig. 2 are the feed chains 15 and 16. Corresponding links of these chains are provided with squaring lugs 17 which have abrupt shoulders at 18 for engagement with the forward margin of the workpiece 5 to make sure that its position is absolutely square as it enters the machine. In the past, it has been necessary to extend the table 9 far enough beyond the holddown conveyor or traveling vise 20 to enable the entire width of the workpiece to be properly positioned on the table and engaged at its rear margin by the squaring lugs before the front margin of the workpiece could enter the grip of the vise.

In accordance with conventional practice, the traveling vise comprises a chain operating over sprocket 21 in sufficient proximity to the table and the feed conveyors 15 and 16 so that the rubber cushions 22 on the individual links of holddown conveyor chain 20 will engage the workpiece with sufficient pressure to hold it securely during operation of the saws 6 or 7, or whatever other tools may be provided on the machine. This has required that the sprockets 23 for the feed chains have had to be considerably more remote from the holddown conveyor than is the operator's hand shown at 24 in Fig. 1 so that the workpiece could be manipulated ahead of the moving lugs and engaged securely with the lugs of both chains before the forward margin of the workpiece passed beneath the holddown.

By reason of the present invention, the table 9 has been made shorter by several feet, its extreme end now being at about the point where the cushion pressure blocks 22 of the holddown become effective on the work. Instead of having to manipulate a workpiece between the advancing lugs and the holddown, the operator now simply pushes the workpiece forwardly on the smooth upper surface of the feed conveyor chains 15 and 16 until its forward margins engage the shoulders 18 of lugs 17. As the operator holds the workpiece against these shoulders for a moment, the cushion blocks 22 of the holddown become effective to clamp the workpiece and thereupon the operator can release his grasp. Not only is the effort required of him considerably less than heretofore, but the time involved is also considerably less than heretofore.

The saws or other tools 6 and 7 may rotate in either direction. The arrow 25 in Fig. 1 indicates clockwise direction of the saw, whereby the action of its teeth tends to advance the workpiece against the shoulders 18. However, this is not required since the grip or the traveling vise is such that if the workpiece is properly aligned against the shoulders at the time it enters the vise and is engaged by blocks 22, its position will be maintained regardless of the direction of rotation of the tools.

As stated above, it is very desirable that the upper surface of the feed conveyor chains 15 and 16 be smooth and free of any irregularities other than the lugs 17, since one of the advantages of the device as shown is the freedom with which the workpiece can be manipulated by the workman to assure that it is properly aligned within a very short length of travel of the feed conveyor chains 15 and 16. He could not accomplish this task without risking injury to the workpiece if he could not freely slide the workpiece on the upper surfaces of the chains.

I claim:

1. A feed for an automatic woodworking machine comprising the combination with laterally spaced feed conveyor chains, said chains being provided with pairs of work-aligned lugs projecting above the table surface and having rearwardly facing shoulders, the chains being elsewhere free of obstruction between consecutive pairs of lugs to enable workpieces to be manipulated into position on the chains, holddown means cooperating with the chains to provide a traveling vise for clamping workpieces manually positioned on the chains in abutment with their respective shoulders, rotary tool means to which workpieces engaged by the traveling vise are advanced in the course of chain and holddown operation, said chains having an extent outside the holddown means which is materially less than the width of the workpieces fed thereto.

2. In a feed for a woodworking machine having a plurality of laterally spaced rotary tools, the combination of a table beneath the tools, a pair of laterally spaced feed chains, and cooperating holddown means comprising a traveling vise for carrying workpieces past the tools, the chains having receiving end portions extending beyond the holddown means to an extent materially less than the corresponding dimension of workpieces to be engaged by the holddown means, the chains having their upwardly exposed surfaces sufficiently smooth to permit workpiece manipulation on the chains without workpiece damage and being provided at intervals greater than the dimensions of the workpieces with upwardly projecting lugs having rearwardly directed shoulders against which workpieces can be manipulated in the course of chain movement and before the holddown means becomes effective to clamp the workpieces to the chains, the table having guide channels in which the respective chains operate and having no substantial extent beyond the holddown means, the space beyond the chains at a distance from the holddown means which is materially less than the dimensions of the expected workpiece being free and unobstructed for use by workmen manipulating successive workpieces into position against said shoulders, each such workpiece being held at its trailing margin by a workman until its forward margin is engaged by said holddown means.

References Cited in the file of this patent

UNITED STATES PATENTS

| | | |
|---|---|---|
| 1,693,606 | Jones | Dec. 4, 1928 |
| 1,847,983 | Rockwell | Mar. 1, 1932 |
| 2,387,446 | Herz | Oct. 23, 1945 |